United States Patent
Bodamer et al.

(10) Patent No.: US 6,226,649 B1
(45) Date of Patent: May 1, 2001

(54) APPARATUS AND METHOD FOR TRANSPARENT ACCESS OF FOREIGN DATABASES IN A HETEROGENEOUS DATABASE SYSTEM

(75) Inventors: Roger Bodamer; Jacco Draaijer, both of Mountain View; Eric Voss, Foster City; Raghu Mani, Mountain View, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/390,028

(22) Filed: Sep. 3, 1999

Related U.S. Application Data

(63) Continuation of application No. 08/880,327, filed on Jun. 23, 1997, now abandoned.

(51) Int. Cl.[7] .................................................. G06F 17/30
(52) U.S. Cl. ................... 707/104; 707/2; 707/3; 707/102; 707/104; 707/10; 709/203; 709/217; 709/245; 709/246
(58) Field of Search ................... 707/10, 2, 100, 707/3, 103, 104, 102; 709/203, 217, 245, 246

(56) References Cited

U.S. PATENT DOCUMENTS

| | | | |
|---|---|---|---|
| 4,736,321 | 4/1988 | Brown et al. | 709/313 |
| 4,949,255 | 8/1990 | Gerth et al. | 709/315 |
| 5,218,697 | * 6/1993 | Chung | 709/230 |
| 5,257,366 | 10/1993 | Adair et al. | 707/4 |
| 5,416,917 | 5/1995 | Adair et al. | 707/203 |
| 5,452,450 | 9/1995 | Delory | 707/10 |
| 5,455,948 | 10/1995 | Poole et al. | 707/102 |
| 5,524,253 | 6/1996 | Pham et al. | 709/202 |
| 5,539,886 | 7/1996 | Aldred et al. | 709/318 |
| 5,542,078 | 7/1996 | Martel et al. | 707/101 |

(List continued on next page.)

OTHER PUBLICATIONS

Hsu et al., "Information resources management in heterogeneous, distributed environments:metadatabase approach", IEEE, pp. 604–625, Jan. 1991.*

Hsu et al., "A metadata system for information modeling and integration", IEEE, pp. 616–624, Jan. 1990.*

Kang et al., "An integrated access control in heterogeneous distributed database systems", IEEE, pp. 222–226, Nov. 1992.*

*Primary Examiner*—Hosain T. Alam
*Assistant Examiner*—Jean M. Corriélus
(74) *Attorney, Agent, or Firm*—Ditthavong & Carlson, P.C.

(57) ABSTRACT

An apparatus and method for accessing foreign processes in a heterogeneous database environment includes a local database server having heterogeneous services to selectively send requests to the foreign processes based on their respective capabilities. A client application sending a statement to the local database server is checked by the local server process to determine if the statement includes a reference to a foreign database system. The local server process selectively outputs a request to an agent process in communication with a foreign database via a generic Application Programming Interface (API). The request output to the foreign database is based on accessing a capabilities table specifying the operations that can be executed by the foreign database. Hence, the heterogeneous services within the local server process manages client statements involving foreign database systems having limited capabilities, and uses the agent process to manage interactions with the foreign database systems, including converting data, to preserve the integrity of the local server process and provide the appearance to the client application of a homogeneous distributed database system.

23 Claims, 7 Drawing Sheets

U.S. PATENT DOCUMENTS

| | | | |
|---|---|---|---|
| 5,596,744 | * 1/1997 | Dao et al. | 707/10 |
| 5,608,874 | 3/1997 | Ogawa et al. | 709/246 |
| 5,617,533 | 4/1997 | Wu et al. | 714/38 |
| 5,627,972 | 5/1997 | Shear | 709/203 |
| 5,651,111 | 7/1997 | McKeeman et al. | 714/38 |
| 5,655,116 | 8/1997 | Kirk et al. | 707/1 |
| 5,706,499 | 1/1998 | Kleewein et al. | 707/10 |
| 5,710,918 | 1/1998 | Lagarde et al. | 707/10 |
| 5,713,014 | 1/1998 | Durflinger et al. | 707/4 |
| 5,721,904 | 2/1998 | Ito et al. | 707/8 |
| 5,745,754 | 4/1998 | Lagarde et al. | 707/104 |
| 5,764,949 | 6/1998 | Huang et al. | 707/102 |
| 5,768,577 | 6/1998 | Kleewein et al. | 707/10 |
| 5,768,589 | * 6/1998 | Bradley et al. | 709/304 |
| 5,787,452 | 7/1998 | McKenna | 707/536 |
| 5,794,234 | 8/1998 | Church et al. | 707/4 |
| 5,806,066 | 9/1998 | Golshani et al. | 707/100 |
| 5,859,972 | 1/1999 | Subramaniam et al. | 709/246 |
| 5,930,793 | * 7/1999 | Kleewein et al. | 707/10 |
| 5,943,671 | * 8/1999 | Kleewein et al. | 707/9 |
| 5,966,707 | * 10/1999 | Van Huben et al. | 707/10 |
| 5,987,463 | * 11/1999 | Draaijer et al. | 707/10 |
| 6,041,344 | * 3/2000 | Bodamer et al. | 709/203 |

* cited by examiner

APPARATUS AND METHOD FOR TRANSPARENT ACCESS OF FOREIGN DATABASES IN A HETEROGENEOUS DATABASE SYSTEM

CROSS-REFERENCE TO RELATED APPLICATIONS

This application is a continuation of the commonly-assigned, application Ser. No. 08/880,327, filed Jun. 23, 1997, entitled "Apparatus And Method For Transparent Access Of Foreign Databases In A Heterogeneous Database System," inventors Roger Bodamer, Jacco Draaijer, Eric Voss, and Raghu Mani, the disclosure of which is incorporated in its entirety herein by reference, now abandoned.

This application is related to commonly-assigned, application Ser. No. 08/880,326, filed Jun. 23, 1997, entitled "Apparatus and Method for Calling External Routines in a Database System," inventors Jacco Draaijer, Roger Bodamer, and Eric Voss, now U.S. Pat. No. 5,987,463, issued Nov. 16, 1999, the disclosure of which is incorporated in its entirety herein by reference.

This application is related to commonly-assigned, application Ser. No. 08/880,333, filed Jun. 23, 1997, entitled "Apparatus and Method for Accessing Foreign Databases in a Heterogeneous Database System," inventors Roger Bodamer, Eric Voss, and Jacco Draaijer, the disclosure of which is incorporated in its entirety herein by reference, now pending.

This application is related to commonly-assigned, application Ser. No. 08/880,325, filed Jun. 23, 1997, entitled "Apparatus and Method for Passing Statements to Foreign Databases by Using a Virtual Package," inventors Roger Bodamer, Jacco Draaijer, Eric Voss, Raghu Mani, now U.S. Pat. No. 6,041,344, issued Mar. 21, 2000, the disclosure of which is incorporated in its entirety herein by reference.

FIELD OF THE INVENTION

This invention relates to database systems and, more specifically, to an apparatus and method for interacting with foreign databases in a heterogeneous database environment.

BACKGROUND OF THE INVENTION

Heterogeneous database environments are environments that contain different, and often incompatible, types of database systems. These different database systems are typically purchased independently by businesses to serve a particular need, function or use of the data. As a result, businesses may have information spread across multiple database management systems. Since every database management system vendor attempts to provide a competitive edge over the offerings of its competitors, the different database management systems are almost by definition incompatible. Even database systems based on SQL language standards and the relational model will be incompatible due to differences in SQL implementations, database definition and communication mechanisms. Incompatibility problems are even more apparent between modern relational database management systems and legacy database management systems that use a hierarchical or network architecture. Hence, the task of combining incompatible database systems is extremely complex.

One prior method for integrating foreign databases or data storage in a heterogeneous environment is depicted in FIG. 1A. FIG. 1A is a diagram of a heterogeneous environment having a database application 10 configured to communicate with foreign databases 12 and 14. The database application 10 from one vendor communicates with the foreign database systems 12 and 14 of other vendors using hardcoded instructions 16 and 18 for the foreign databases 12 and 14, respectively. However, this arrangement is limited from an extensibility and scalability point of view, since every application in the heterogeneous environment must be rebuilt with new hardcoded instructions every time an unfamiliar foreign database is added to the heterogeneous environment. Hence, the application 10 would not be able to access a foreign database if the particular instructions for the data format and definitions of that foreign database were not coded directly into the application 10.

Another prior method is shown in FIG. 1B, where a database system 20 accesses the foreign databases 12 and 14 via a gateway 22. The gateway 22 allows client applications to access the foreign databases by translating data and SQL statements having the format of the database system 20 into formats that are recognizable by the foreign database systems. Specifically, the gateway 22 maps the data representation and functionality of one data source onto another data source, performing a translation of SQL statements from the database system 20 into a syntax recognizable by either the foreign database 12 or the foreign database 14. The gateway 22 then sends the translated commands to the targeted foreign database, maps the resulting data from the targeted database into the format of the database system 20, and sends the resultant data back to the database system 20.

Use of the gateway 22, however, suffers from the disadvantage that the mapping mechanisms in the gateway 22 tend to support only the most basic functionality that is common to all of the various databases. Hence, the functionality level of the mapping mechanism is effectively lowered to the lowest common denominator within the group of databases supported by the gateway 22. In addition, SQL mapping by the gateway 22 cannot be performed dynamically, requiring the mapping definitions to be regenerated each time a new and unrecognized foreign database is added. Finally, database performance may be effected since the gateway 22 adds another layer of complexity between the application and the foreign databases.

SUMMARY OF THE INVENTION

There is a need for an arrangement that provides transparent integration of processing statements using native and non-native (i.e., foreign) databases in a heterogeneous database environment, where operations necessary for execution of a client statement are selectively translated and sent to a foreign database system based on the corresponding capabilities of the foreign database system.

There is also a need for an arrangement that enhances a local database system by integrating operations of foreign databases with the local database system routines to form a heterogeneous database environment while simultaneously insulating the local database system from potential failures in the foreign databases.

There is also a need for an arrangement that provides transparent integration of foreign databases in a heterogeneous database environment.

These and other needs are attained by the present invention, where a local server process sends operation requests to an agent process in communication with foreign processes configured for executing the operation requests, the local server process completing execution of a client statement based on results received from the foreign processes via the agent process.

According to one aspect of the present invention, a method for processing a statement from a client comprising the steps of receiving the statement by a local server process, determining a plurality of operations that need to be performed to execute the statement, sending a request to an agent in communication with the foreign database to perform at least one of said operations, and completing execution of the statement in the local server process based on results received from the foreign database via the agent process. The request is generated using heterogeneous services modules in the local server process that provide transparency of the operations executed by the foreign process to the extent that the foreign process appears to the client as a remote process in a homogeneous database system (i.e., all database servers are from the same vendor).

Another aspect of the present invention provides computer system configured to respond to a statement, comprising a local server process receiving the statement from the client and configured for determining operations necessary for execution of the statement, and an agent process in communication with a foreign database system. The local server process includes heterogeneous services configured for identifying one of the operations that can be performed by a foreign server process, and sends an operation request to the agent process for forwarding the operation request to the foreign server process to perform the identified one operation. The local server process completes execution of the statement based on results received from the foreign server process via the agent process.

Additional objects, advantages and novel features of the invention will be set forth in part in the description which follows, and in pat will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for processing statements by accessing foreign processes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1A:
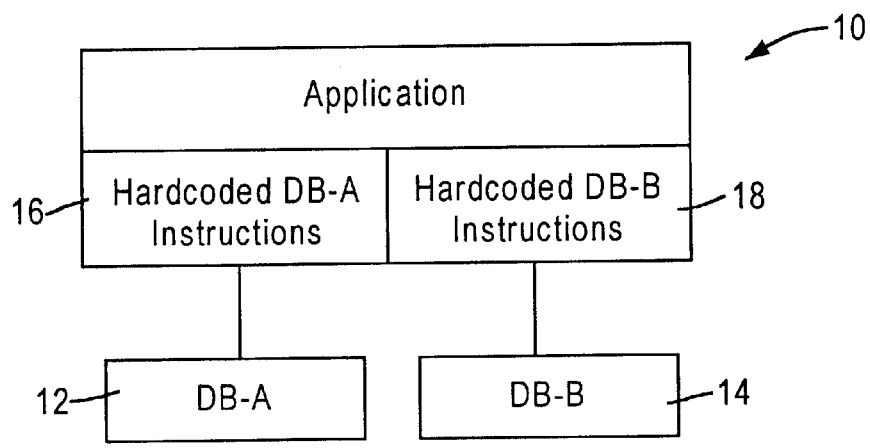
FIGS. 1A and 1B are block diagrams illustrating prior art implementations of integrating foreign databases in a heterogeneous database environment.
Figure 1B:
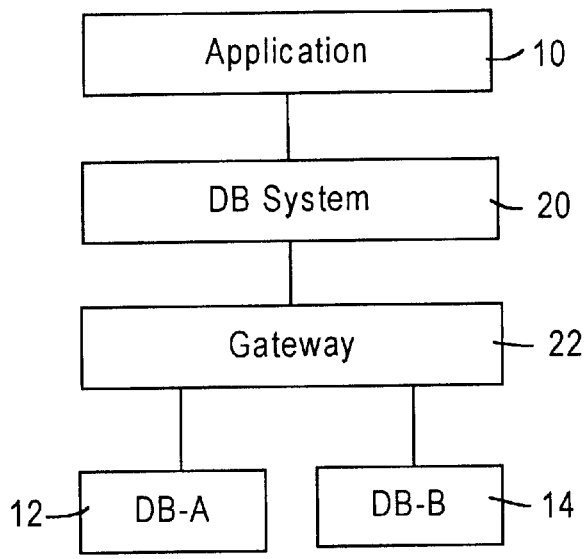
Figure 2:
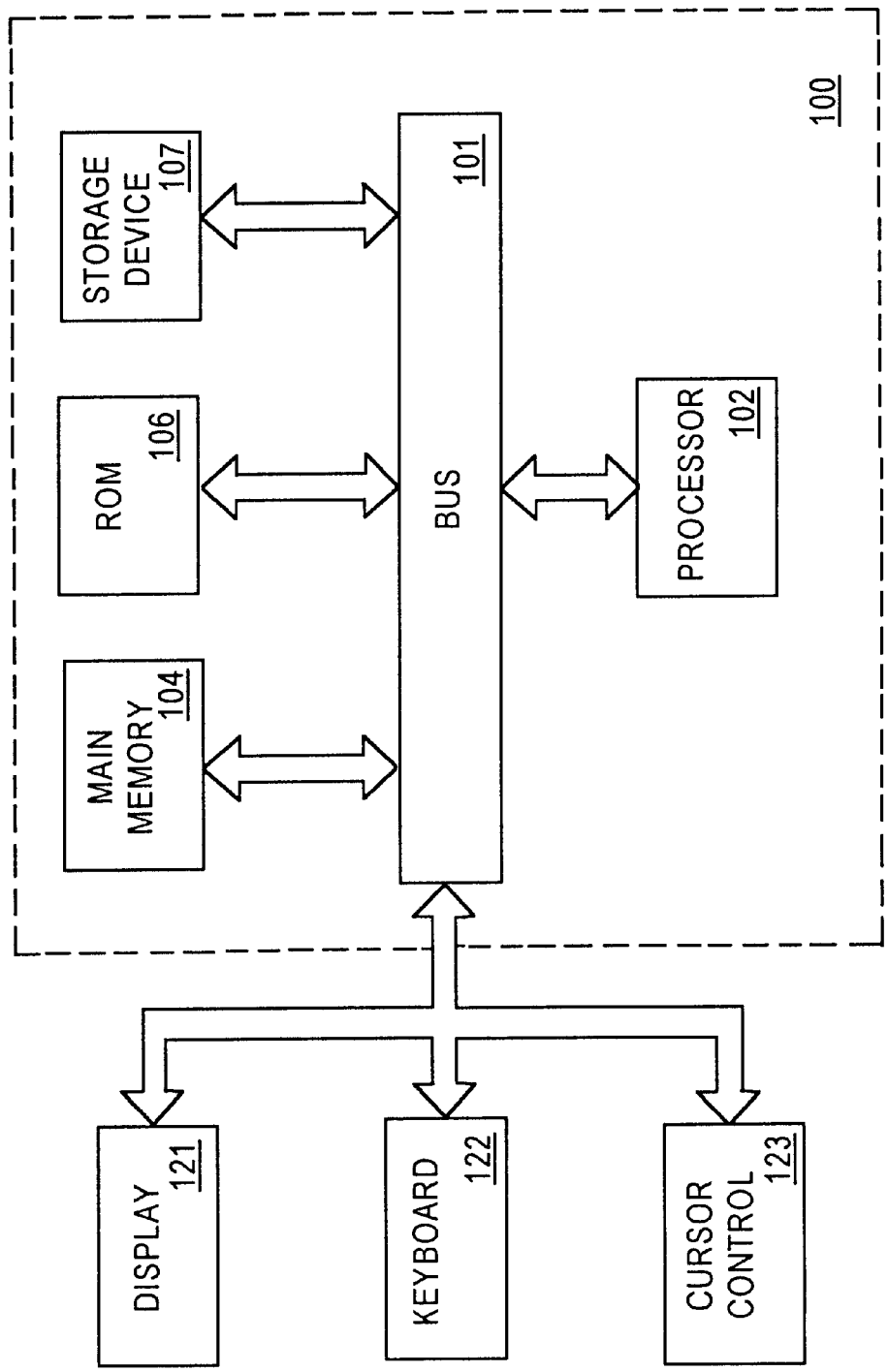
FIG. 2 is a block diagram of a computer system that may be used to implement an embodiment of the invention.

Referring to FIG. 2, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse. The present invention is related to the use of computer system 100 to process statements by accessing foreign processes. According to one embodiment, the processing of statements by accessing foreign processes is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Heterogeneous Architecture

Figure 3A:
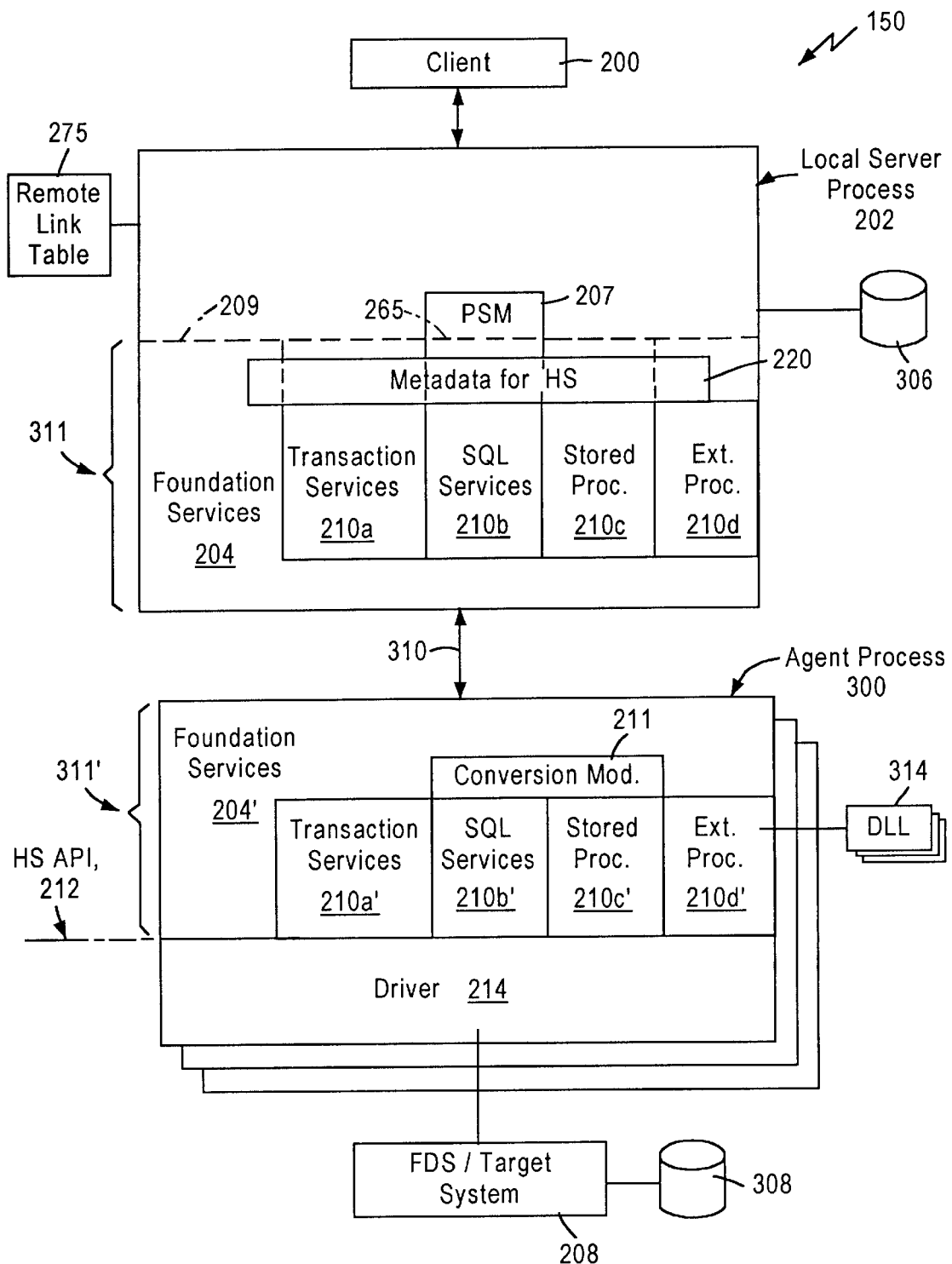
FIGS. 3A and 3B are diagrams illustrating an database server architecture for a heterogeneous database environment according to an embodiment of the present invention.
Figure 3B:
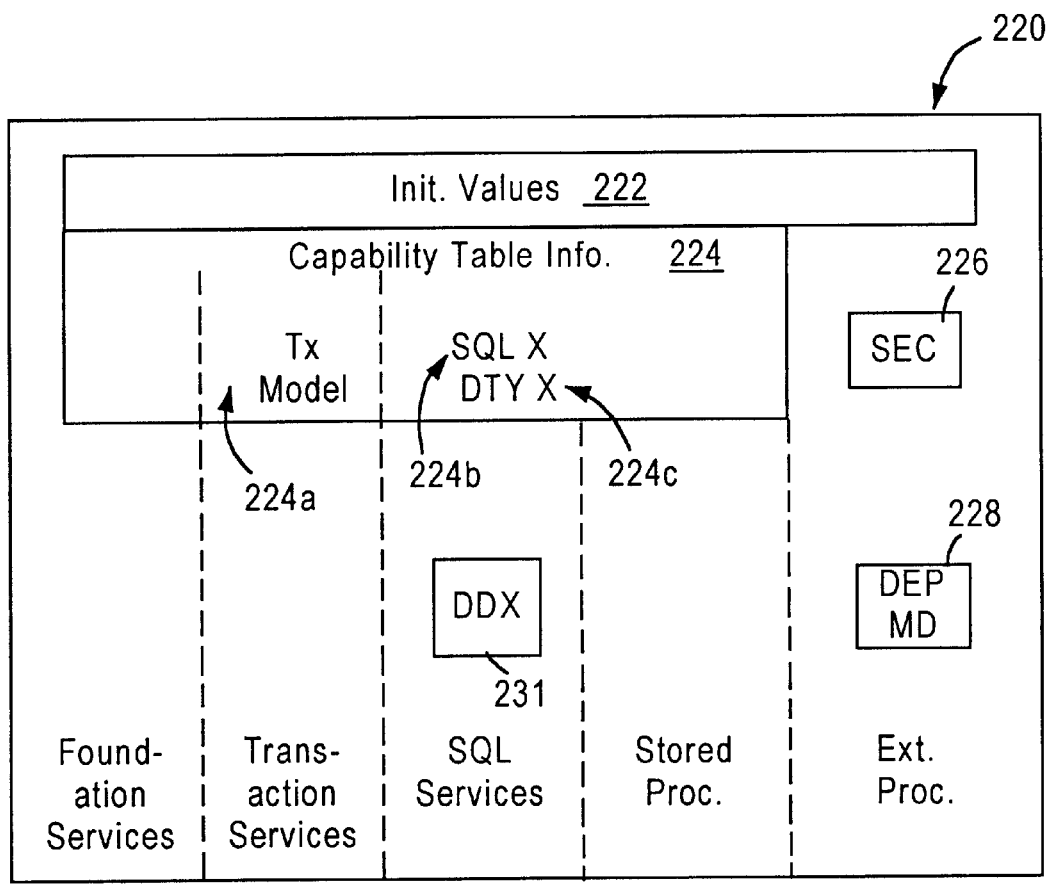

FIGS. 3A and 3B are diagrams summarizing an architecture for a database server process in a heterogeneous environment according to an embodiment of the present invention. FIG. 3A illustrates the overall architecture 150, and FIG. 3B illustrates a diagram of metadata definitions for use by the database server, described below. As shown in FIG. 3A, a client process 200, for example an application program, supplies a statement such as a SQL statement to a local server 202. The local server 202 includes routines for providing the basic services necessary for performing local server operations, for example memory services or context services. The local server 202 performs conventional query processing when processing native requests for data directly accessible by the local server 202, for example data stored in a local database 306. In a "homogeneous database system," the local server 202 can coordinate with a remote server from the same vendor in a distributed environment for coordinating commitments to respective transactions.

As described in detail below, the client statement may require an operation to be performed by a non-native (i.e., foreign) process, such as a foreign database server 208 or an external routine. For example, the client statement may request data from a foreign database 308 under the control of a foreign database server 208. In this case, the local server 202 cannot complete execution of the statement without receiving the data from the foreign database server 208. Alternatively, the client statement may also include a request to be performed by the foreign database server 208 but without returning data, for example creating a new data table or updating data in the foreign database 308. The client statement may alternatively include a call to a procedure that is implemented by the foreign database server 208, but not by the local server 202.

The client statement may also call an external routine that extends the capabilities of the local server 202 beyond a standard set of commands. Specifically, users interact with many database systems by submitting SQL statements to the database systems. To supplement the functionality of a limited standard set of SQL commands, external routines (i.e., "extensions") can be coded, potentially by third parties, in a third generation language (3GL) such as C or C++. However, it is desirable to control the execution of the external routines to ensure that failures in the external routines do not adversely affect the local server 202. For example, a common bug in a C function de-references an invalid pointer and causes a segmentation fault, resulting in a crash.

The heterogeneous architecture of FIG. 3A includes heterogeneous services modules 311 and 311' that augment the distributed functionality of the local server 202 to enable non-native database servers 208 to be incorporated into the distributed architecture. The module 311 is executed in the local server process 311 and the module 311' is executed in an agent process 300. The local server process 202 communicates with the agent process 300 via a remote process mechanism in the foundation services 204. The foundations services 204 perform the basic services that are needed for processing heterogeneous operations. The basic services include memory handling, establishing the proper context (e.g., login and logoff), and the remote process mechanism. The remote process mechanism provides a framework that allows the local server 202 to operate in a heterogeneous environment (e.g., a distributed system having servers from different vendors).

The agent process 300 also enables external routines (e.g. C functions) stored in a dynamically-linked library (DLL) 314 to be executed without concern of crashing the local server 202. Thus, the agent process 300 provides an interface between the local server 202 and a foreign database server 208 that ensures that any operation of the foreign database server 208 will not adversely affect the local server 202. Furthermore, the agent process 300 may execute a driver 214, which has been provided by a third party such as the vendor of the foreign database server 208. Hence, the local server 202 is insulated from the routines executing in the agent process 300 to protect the local server 202. If the external routines executing in the agent process 300 are later deemed reliable or safe, the remote process mechanism can be removed and code for the agent process 300 can be linked directly into the local server 202.

The agent processes 300 are separate processes, started by the heterogeneous services 311 of the local server 202 and executed in an address space separate from the local server 202. Hence, the agent process 300 protects the local server 202 from crashes that may occur in the agent process 300 during execution of a non-native routine. In addition, the agent process 300 may be executed on a machine separate from the local server 202.

The heterogeneous services modules 311 and 311' enable the local server 202 to complete execution of client statements that require execution of non-native operations. Specifically, the local server 202, upon receiving a client statement having a database link to a remote process, will access a remote link table that is stored on the file system of the local server 202. The remote link table includes information that specifies how to a point to a communication link to a remote process based on the database link specified in the client statement. Specifically, the remote link table uses the database link as an alias to identify (1) the remote process executing on a remote machine, (2) link-related information such as network address, TCP/IP port number, etc., to find out exactly which process to connect to, and (3) whether the database link points to a foreign system. If the remote link table specifies that the referenced database link points to a foreign system, the local server 202 will invoke the heterogeneous services using the first heterogeneous services module 311 in the local server 202, which in turn invokes the second heterogeneous services module 311' in the agent process 300.

The first heterogeneous services module 311, which is built upon the foundation services 204, performs all possible operations that do not require the interaction of the external process. For example, the first heterogeneous services module 311 helps identify an operation necessary for execution of the client statement that must be executed by an external process (e.g., an external routine or a foreign database system), and forwards the identified operation to the appropriate agent process 300 via the identified remote path for execution. As described below, the first heterogeneous services module 311 includes specific services modules for controlling respective operations.

The agent process 300 includes foundation services 204' that complement the operations of the foundation services 204 in the local server 202. For example, the foundation services 204' maintains the communication path 310 with the local server 202 by handling the requests received from the local server 202 and sending results during execution of the agent process 300 to the local server 202. The communication path 310 can be a shared memory or other interprocess connection or a network connection. The second heterogeneous services module 311', which is built upon the foundation services 204', manages the operations requiring interaction with the third-party code, whether the third-party code is an external routine stored in the dynamically linked library 314, or a driver communicating with the foreign database server 208. Hence, the first heterogeneous module 311 will perform all operations that do not require an actual interface or interaction with third-party code, whereas the second heterogeneous module 311' will preferably perform only those operations associated with interacting with the third-party code, such as data translation between the conversion module 211 and the third-part driver 214 or execution of a third-party external routine from the library 314.

The first heterogeneous services module 311 includes a plurality of modules that enable the local server 202 to interact with the foreign processes via the appropriate agent process 300. Specifically, the heterogeneous services include a transaction services module 210a, a SQL services module 210b, a stored procedures module 210c, and an external procedures module 210d. As described below, the heterogeneous services in the local server 202 also include a passthrough SQL module (PSM) 207 that operates separately from the modules 210. Each of the modules 210a, 210b, 210c, and 210d, are built upon the foundation services 204, and are integrated with the local server 202 to use services within the local server 202, as shown by the dotted line 209 in the heterogeneous services.

The dotted line 209 refers to a native API interface, described below, used by the local server 202 to issue calls to a remote server. Instead of sending the API calls directly to the foreign database system 208, the heterogeneous services module 311 intercepts the calls to the foreign database system 208 and remaps the API calls by the local server 202 to a generic API 212. The heterogeneous services module 311 will then issue a remote procedure call to the agent process 300 to call a selected function in the driver 214. The agent process 300 will then call the selected function in the driver 214 (e.g., "parse").

Each of these modules 210 in the heterogeneous services module 311 is configured to map a particular database operation to a target foreign process based upon the operation specified in the client statement and based upon meta-data definitions metadata for the heterogeneous services stored within a data dictionary 220, described below. As shown in FIG. 3B, the data dictionary 220 includes metadata definitions for use by the foundation services 204, as well as for the different modules 210 and 207.

There are four types of translations that may occur between the local server 202 and the foreign database server 208. The first type of translation relates to the Application Program Interface (API) of a given database system. Specifically, an API is a set of functions, procedures, or routines specific to a module, such as an application or library, that can be called by an external module to communication with the module. For example, Oracle has a set of API referred to as OCI API, where functions such as "oopen", "oparse", "oexec", "ofetch", and "oclose" correspond to the functions of opening a cursor, parsing a SQL statement, executing the cursor, fetching results, and closing the cursor, respectively. However, one database system (e.g., Oracle) will have its own API set, while another database system (e.g., Sybase) will have its own API set. Since the API for each database system can be completely different, it becomes particularly difficult to develop any systematic translation scheme.

Hence, the first type of translation, executed by the heterogeneous services module 311 in the local server 202, maps the native API protocol (e.g., Oracle API) onto a generic API, identified as the HS API 212 in FIG. 3A. The driver 214 for a specific foreign database server 208 can then map the generic API 212 to the API set of the foreign database server 208.

A second type of translation relates to SQL statements, which are highly structured. Hence, although a SQL statement in the format of the local server 202 may not be acceptable to the foreign database system 208, the structured nature of a SQL statement enables the heterogeneous services modules 311 to convert the SQL statement of the local server 202 to the format of the foreign database system 208 using a SQL services module 210b. In addition, API functions such as "parse" are performed by a majority of database systems. Hence, a generic function such as "parse" for a certain SQL statement can be passed to the foreign database system 208 using the modules 311 in the local server 202 by translating the SQL statement from the native (local server process 202) format to the format of the foreign database system 208. The translated SQL statement in foreign database system format can then be passed as an argument of a generic function (e.g., parse). For example, an SQL statement translated by the SQL services module 210b can be an argument for the Oracle-specific call "opiosq," which is then mapped onto the generic API 212 as "parse." Thus, the generic finction is called at the HS API 212 having the translated SQL statement as an argument. The driver 214 then can map the generic function onto the foreign database system API, while including the translated SQL statement as the argument.

A third type of translation relates to data types, where the local server 202 represents data (e.g., dates) in a different format than the foreign database system 208. Hence, data must be converted in the agent process 300 if the local server 202 is fetching results from the foreign database system 208, or sending or receiving bind variables to and from the foreign database system 208. This data type translation is executed in the agent process 300 by a conversion module 211.

A fourth type of translation is data dictionary translation, executed in a SQL services module 210b within the heterogeneous services module 311 of the local server 202. Every relational database has its own set of data dictionary tables which store various kinds of information (known as "metadata") about the objects in the database created by its various users. This set of tables along with views defined on them are together called the "data dictionary". As a user makes modifications to his schema (for example, creating or deleting a table), the local server 202 will keep track of the modification by automatically adding or deleting entries in one or more tables of the data dictionary. The foreign database system 208, however, may include similar meta-data that is organized differently. In order to make the foreign database system 208 appear to the client 200 as homogeneous relative to the local server process, the client must be given the impression that the metadata in the data dictionary of the foreign database system 208 is in the same format as in the data dictionary of the local server 202. For example, assume the data dictionary for the local server process 202 includes a table entitled "user_catalog," and the client 200 issues a query on "user_catalog @ FDS", where "FDS" is an identifier for foreign database system 208. However, if the foreign database system 208 does not have the table "user_catalog", but rather the metadata is spread across different tables, the client 200 is given the appearance that the table exists at the foreign database system 208 in the structure perceived by the client.

Hence, the data dictionary translation gives the appearance to the client that the foreign database system 208 includes metadata in the format and structure as stored for the local server 202. Thus, the heterogeneous services modules 311 and 311' map the query to accommodate the data dictionary structures in the foreign database system 208, get the result back from the foreign database system 208, and return the results to the client 200 in the format of the local server 202.

In an example of a data dictionary translation from an Oracle server to a Sybase server, the heterogeneous services modules 311 and 311' convert the client statement "select table_name, table_type from user_catalog @ link" to a Sybase-compatible query, for example:

select SO.name table_name,
  substr('TABLE', 1,5 * (1-abs(sign(ascii(SO.\"type\")-ascii('S')))))‖

```
substr('TABLE', 1 5 * (1-abs(sign(ascii(SO.\"type\")-
    ascii('U')))))||
substr('VIEW', 1,4 * (1-abs(sign(ascii(SO.\"type\")-
    ascii('V')))))||
table_type
from sysusers @ link SU, sysobjects @ link SO
where SU.UID=SO.uid and SU.name=USER @ link
```

This gives the client 200 the impression that there actually is a table called "user_catalog" at the remote server and that it actually does have columns called "table_name" and "table_type," when actually the information is extracted from two Sybase data dictionary tables "sysusers" and "sysobjects".

Hence, the data dictionary for the local server 202 may include tables that are not found on in the data dictionary of the foreign database system 208. If the local server 202 receives a query from client 208 referencing one of these tables with respect to foreign database system 208, the local server 202 first attempts to use that table on the foreign database system 208. If the table does not exist at the foreign database system 208, an error is returned and, in response, the heterogeneous services module 311 checks a data dictionary translation table (DDX) 231. If translation information is found, the query is translated and sent to the foreign database system 208 via the agent 300. The results of the query from the foreign database system 208 are then translated before being back sent to the client 200.

Another aspect of data dictionary translation occurs when a data dictionary table for the local server 202 includes information that is not present in the referenced foreign database system 208. Assume that a client statement includes a reference to a data dictionary table at the foreign database system 208, in which the information does not exist at the foreign database system 208 according to the capability table 224 and the DDX 231. To give the client 200 the appearance that the table exists in the foreign database system 208, the DDX 231 may include a reference for the heterogeneous services module 311 to mimic the existence of the table in the foreign database system 208 by going to the local database and requesting from the local database the definition of the requested table. The heterogeneous services module 311 then returns to the client 200 (via the local server 202) the definition of the table. If the client 200 requests information, the local server 202 will return an error message that no rows are selected.

Hence, all the translations are performed by the heterogeneous services module 311 in the local server process, except for the data type conversion, which is performed in the agent process 300.

The agent process 300 includes services and routines to carry out prescribed operations for the local server 202. Specifically, a plurality of different agents 300 can be initiated by the heterogeneous services of the local server 202 to interact with respective foreign database servers 208. For example, one agent 300a may interact with a Sybase database system, and another agent 300b may interact with an Informix database system, etc. Each agent 300 includes the foundation services 204' and a conversion module 211, described below. Each agent also includes a corresponding set of services modules 210a', 210b', 210c' and/or 210d' that correspond to the capabilities of the corresponding foreign database system. Hence, if a foreign database server 208 does not have transaction services, the corresponding agent 300 interacting with that foreign database server 208 will not need a transaction services 210a'. Alternatively, the transaction services 210a' may be available in the compiled code for the agent process 300 but unused because the metadata stored in the data dictionary 220 does not identify that foreign database system as supporting that service.

The conversion module 211 provides the data translation services necessary for converting from the data format native to the local server 202 to the data format of the target system 208. Three types of data type conversion are possible. In the first type, the conversion module 211 contains all the necessary conversion routines to convert from the native data type of the local server 202 to the data type of the target system 208. In the second type, the conversion module 211 converts from the native data format based on routines supplied by a driver 214, where the conversion routines within the driver 214 may be supplied, for example, by the manufacturer of the target system 208. In the third type, the native data type is described in terms of an intermediate data type to perform an n-step conversion. For instance, one of the steps is performed by a conversion originally supplied with conversion module 211 and another of the steps is performed by a conversion finction registered by the driver 214. Regardless of the conversion type, the data type translation is performed in the agent process 300, transparent to the local server 202.

In the case of the second and third type of data type conversion, the driver 214 registers conversion routines having a predetermined prototype with the conversion module 211. The predetermined prototype specifies the number and type of the arguments of a conversion routine as well as the type of the return value, if it exists. Thus, the conversion module 211 sends data (i.e., an array of numbers) invokes a registered conversion routine of the driver 214 for translating the data to the format of the foreign database system. Alternatively, the driver 214 may specify an intermediate n-step conversion, where the conversion module 211 translates from the native data type to an intermediate data format specified by the driver 214, enabling the conversion routine of the driver 214 to convert from the intermediate data format to the internal format of the foreign database system 208. The intermediate date format can be an industry-standard data format, such as the ISO date format, to simplify the development of the driver 214 by third parties.

Thus, the local server 202 uses the heterogeneous services to output an operation request (e.g., an API call or an SQL statement) to a target foreign database (e.g., foreign database 208) by sending the request to the agent process 300. The conversion module 211 in the agent process 300 converts the data types to the format of the foreign database server 208, using internal conversion routines or registered routines supplied by the driver 214. Use of the agent 300 to execute registered routines supplied by the driver 214 thus protects the local server process 202 from crashes. The translated data in the foreign format is output from the agent process 300 to the foreign database server 208 to process the operation request. Once the foreign database server 208 generates results based upon processing the operation request, the data results are translated by the conversion module 211 to the data type of the local server 202 in accordance with the appropriate services module 210'. The local server 202 can then complete execution of the client statement based upon the results received from the foreign process 208b.

FIG. 3B is a diagram illustrating a part of a data dictionary 220 providing metadata definitions for heterogeneous services. The data dictionary 220, stored in the local database 306, enables the local server 202 to determine how to process a received client statement. As described below, a foreign server 208 can be accessed either by referencing the specific foreign system, by referencing the heterogeneous services 210 configured to identify the appropriate foreign system, or by providing the local server 202 with definitions enabling the local server 202 to independently identify a call to a foreign server 208. The data dictionary 220 includes an initialization table 222 that specifies the information needed to startup and initialize an agent and connect it to a foreign database server 208. The initialization table 222 is used by all the services, including the foundation services 204, the transaction services 210*a*, the SQL services 210*b*, the stored procedures 210*c*, and the external procedures 210*d* The values are defined partly by the heterogeneous services, and partly by the corresponding driver 214.

The data dictionary 220 also includes a capability table 224. The capabilities table 224 specifies the capabilities of the target system 208. For example, the capabilities table 224 includes a transaction services model 224*a* that describes the transaction model of the target system 208. Transaction models of target systems range from just read-only support at one end to full two-phase commit support at the other end. The SQL translations (SQL X) services model 224*b* provides SQL translation information on how to translate SQL functions in the local server 202 onto the functions of the target system 208 for the SQL services module 210*b* and the stored procedures module 210*c*, described below. The data type translations (DTY X) model 224*c* provides information on how to map foreign data types to data types native to the local server 202 for the SQL services module 210*b* and the stored procedures module 210*c*, as well as the conversion module 211.

The data dictionary 220 also includes a security table (SEC) 226 and a distributed external procedures metadata (DEP MD) table 228. The SEC table 226 stores information about users that have privileges to create, drop, alter, and/or execute an external procedure, and the DEP MD table 228 contains information to map a PL/SQL function onto an external procedure, such as a C function. The information in the DEP MD table 228 may include data types, number of arguments, the name of the finction, indicator values, etc. Thus, the DEP MD table 228 stores metadata that is not relevant to the local server 202, but which is necessary to perform the distributed external procedure as it is passed to the agent process 300.

The data dictionary 220 also includes a data dictionary translation table (DDX) 231, described above, that contains a list of data dictionary table names and respective translation instructions for the data dictionaries in the foreign database system 208. The translation instructions will include the translation (mapping) information on how to map from the native data dictionary tables to the data dictionary tables of the foreign database system 208. Alternatively, if the foreign database system 208 does not include the corresponding metadata, the DDX 231 will include a mimic instruction for the corresponding mapping.

The data dictionary 220 enables the local server 202 to determine the relative capabilities of a target foreign server to process a statement in the agent process 300, and thus enables the local server 202 to call the appropriate services 210 to obtain the desired result.

The heterogeneous services in the local server 202 of FIG. 3A are performed by modules 210 that are built upon the foundation services 204 and integrated with the local server 202. The SQL services module 210*b*, also referred to as a query services module, controls translation of SQL statements identified for execution by a foreign database server 208 to the corresponding foreign format. Specifically, assuming that the client statement includes a SQL statement recognized by the local server 202 as referencing data in a foreign database (e.g., foreign database "DB_A" 208*a*), the local server 202 parses the SQL statement into operations necessary for execution of the statement. The DTY X table 224*c* provides the data translations to translate the data object definitions. The SQL services module 210*b* obtains the mapping information from the DTY X table 224*c*, and sends the mapping information to the agent process 300 for the conversion module 211 to perform the data type translation.

Hence, all the translation information is stored in a table in the local database 308. The mapping information stored in the data type translation table 224*c* is then sent by the HS 311 to the agent 300 for data type translation.

The transaction module 210*a* is configured to coordinate transactions between the local server 202 and the corresponding foreign server 208, for example distributed transactions such as a two-phase commit transaction as performed in current commercially available Oracle database systems. Based on the capabilities specified in the capabilities table 224, the transaction module 210*a* can make transaction related calls, such as "begin transaction," "end transaction," and "commit," to the agent process 300. The corresponding module 20*a*' passes these generic transaction calls on to the driver 214, which maps the transactions calls into transaction calls appropriate for the target system 208.

The stored procedures module 210*c* is used to perform a "describe operation" dynamically for an operation within the client statement. Specifically, the local server 202 sends a request to the target system 208 to describe the specified operation, and will receive a response that describes the number and types of the parameters for performing the operation. For example, a procedure may be described as having five prescribed arguments. The response enables the stored procedures module 210*c* to determine how to use the SQL services module 210*b* for data type conversions. Thus, the stored procedures module 210*c* enables a function to be invoked at the target system 208 (via the agent process 300) by identifying the operation to be performed, specifying the arguments, and requesting that the operation be executed. This module is thus particularly helpful for executing stored procedures (e.g., fourth-generation (4GL) routines) in the target system 208.

The external procedures module 210*d* is configured to control execution of external procedures, also referred to as external routines, for which there is not a description of the function provided by a foreign database server 208, but rather is intended to be executed as an enhancement to the local server 202. In other words, the external routine is implemented as a C function that is incapable of describing itself. In this case, the metadata needs to be separately generated based on an analysis of the function and stored in the DEP MD table 228. Once the metadata for the external routine is stored in the DEP MD table 228 as described below, the external routine can be called by causing the agent process to call the external routine from a specified address in the DLL 314, followed by passing of any necessary parameters to the agent process 300.

According to the disclosed embodiment, the local server 202 may selectively use any of the services modules 210*a*, 210*b*, 210*c*, or 210*d* to perform a certain operation. For example, the transaction services 210*a* may be used in combination with the SQL services 210*b* for a database gateway. The external procedures 210*d* may be used with the transaction services 210*a* for distributed external procedures.

Figure 4:
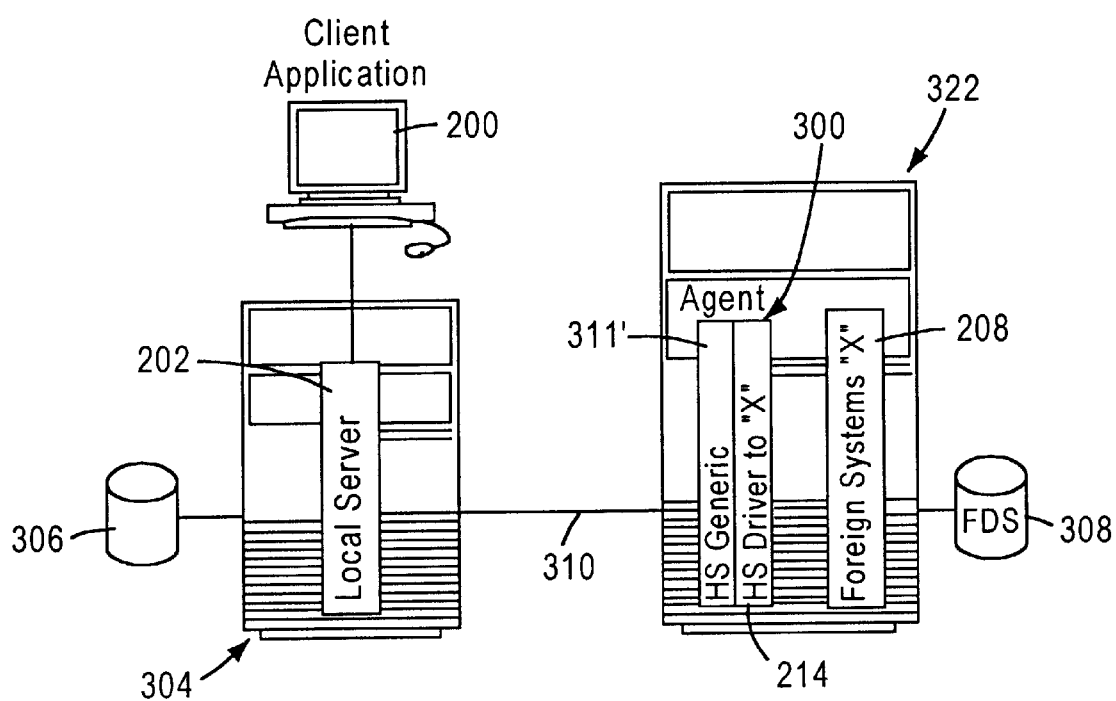
FIG. 4 is a diagrams illustrating an implementations of the database server architecture of FIG. 3 in a heterogeneous distributed environment.

FIG. 4 is a diagram illustrating an exemplary implementation of the heterogeneous architecture of FIG. 3.

Specifically, the agent process 300 may be executed in a second processing system 322 separate from the first processing system 304 executing the local server 202. In such an arrangement, the local server 202 accesses local data using solely the first processing system 304 by accessing a local database 306. However, if local server 202 needs to access foreign data in a foreign database 308, the local server 202 communicates with the agent process 300 via a network connection 310. For example, the statement from the client application 200 may be a SQL statement "select * from table @ FDS," where "FDS" is identified by the local server 202 as a reference to the foreign database system 208. If there is no prior connection with the remote computing system 302, the foundation services 204 will establish a connection 310 to a listener agent of the remote computing system 302, which will spawn the agent process 300. The foundation services 204 will then initialize the agent 300, log on for verification (e.g., log on using a user name and password), and send the statement to the agent process 300. The agent process 300 receives the statement from the local server 202, and uses its foundation services 204' and associated modules 210 and 211 (shown generically as "HS Generic" 311') to send the appropriate statement to foreign server 208. If the conversion module 211 does not have its own internal conversion routine, the agent process 300 will send the translated request to the foreign server 208 via the API 212 using the foreign database driver 214.

The arrangement of FIG. 4 enables distributed processing between the local server process 202 and the foreign process 208, where the heterogeneous nature of the statement processing (i.e., between a native system and a foreign system) is transparent the client application 200. Specifically, the arrangement of FIG. 4 enables transparent heterogeneous processing, where the local server process 202 completes execution of a statement from the client 200 based upon at least one operation executed by the foreign process 208 that is necessary for processing of the statement by the local server process 202, while maintaining the appearance to the client application 200 that the operation is performed by a remote server in the same native system, i.e., a homogeneous distributed database system in which all database servers are from the same vendor. This arrangement, also referred to as "transparent SQL processing," enables the local server process 202 to process at least a portion of the client statement using the foreign system 208, while maintaining the appearance to the client application 200 that the processing of the client statement at a remote site uses a remote server from the same vendor as the local server 304. Hence, if the local server process 202 is an Oracle server process, the foreign database system 208 (e.g., Sybase, Informix, etc.) will appear to the client as a remote Oracle server process.

It may be desirable in certain instances for the client application 200 to be aware that a foreign system is accessed. For example, the client application 200 may wish to send an SQL statement to the foreign server 208, in the foreign SQL syntax, in an attempt to access or manipulate data in the foreign system. In this case, an attempt by the local server 202 to process the statement having the foreign protocol expression would otherwise result in an unrecognizable command. Hence, the architecture of FIG. 3A includes a passthrough module 207 that allows the client application 200 to send a foreign SQL statement to the foreign server 208 without processing by the local server 202. For example, the client application 200 may submit an SQL statement that invokes a procedure that is not implemented by the local server 202. As described below, a multiple calls to the passthrough module 207 can be bundled into a single foreign client statement provided to the API 212. For example, the foreign server 208 can receive a single call having multiple bind variables, described below, as opposed to multiple calls of single bind-variables made to the passthrough module 207.

Figure 5:
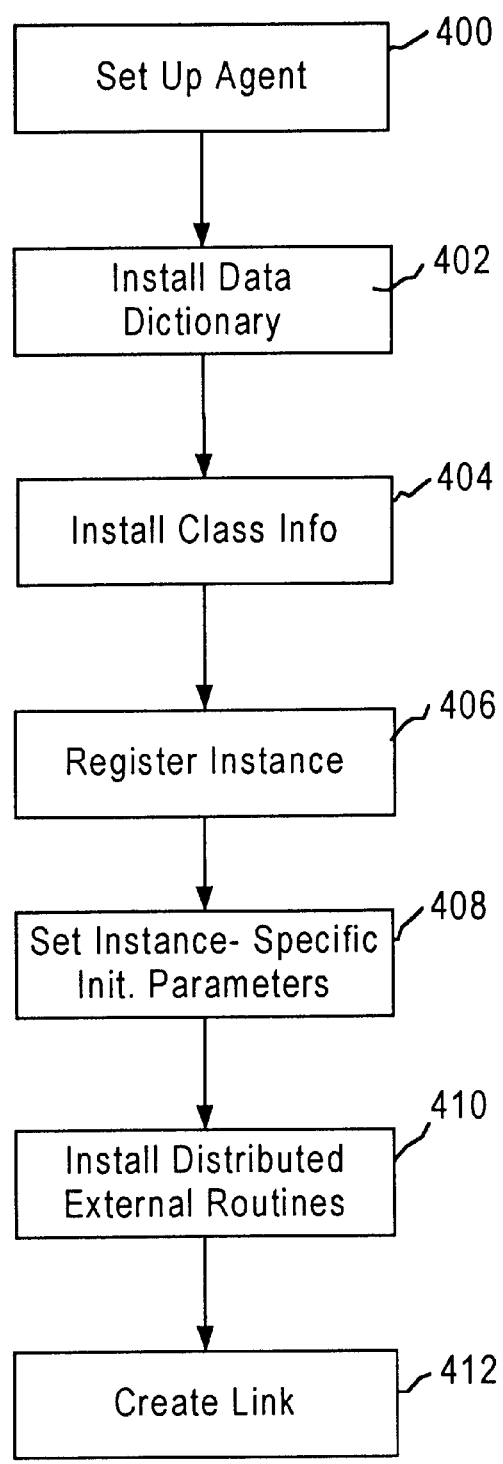
FIG. 5 is a diagram illustrating the steps of registering a foreign process to the database server architecture of FIG. 3.

FIG. 5 is a diagram illustrating steps to register a foreign server 208 with the local database server 202 for establishing the heterogeneous architecture of FIG. 3. A connection to the foreign server 208 is first established by registering an agent in step 400, enabling the foundation services 204 to set up a communication path 310 with the foreign system 208 via the corresponding agent process 300. As recognized in the art, commercially available listener agents can be configured to set up the agent process 302 based upon standardized API instruction sets. As described below, the listener agent (not shown) may control the initiation and connection of multiple agents to the local server process 202. Alternatively, the functions of the listener agent may be performed by the foundation services 204.

Once the listener agent (or the foundation services 204) has been configured in a way to start up the agent process 300, the data dictionary 220 is installed in step 402. Class information is then installed in the data dictionary table 220 in step 404. The data dictionary 220 stores class and instance information that identifies the capabilities of the foreign system and the objects corresponding to the foreign system 208, respectively. For example, the capabilities table 224 stores the foreign system capabilities, SQL translations, and the initialization table 222 stores initialization parameters, etc., for each foreign system as groups of classes to minimize unnecessary redundancy. Specifically, a class defines a type of foreign system. At the same time, instance specific information is necessary for each transaction performed by the local server 202. Accordingly, the capabilities table 224 can store both class and instance-level information. Hence, multiple instances can share the same class information, but each foreign system instance will have its own instance-level information. An example of a class is a foreign system from a particular vendor. Subclasses may also be subdivided within the class, for example, for individual versions of the vendor-specific database systems.

After the capabilities table 224 has been installed with the class information, the foreign system instance 208 is registered in step 406 with a new instance name and the class to be used to access the foreign system.

Instance-specific initialization parameters are then set in step 408 for each instance, for example a domain (virtual path) for a foreign system, a database name for the foreign system, an internal unique name used by the local server 202 for creating distributed transaction identifications, language settings for the foreign system, the maximum number of cursors (i.e., assigned memory spaces) that can be open, and the ability of the foreign system to become a commit point site in a distributed transaction. Agent-specific initialization parameters may also be required, for example, connection information required to connect to a foreign system.

Once the instance-specific initialization parameters have been set in step 408, then desired external routines are installed in the DLL 314 in step 410. The connection is then established in step 412 (e.g., a communication path 310) to test the access to the foreign processes 208.

Heterogeneous Statement Processing

Figure 6:
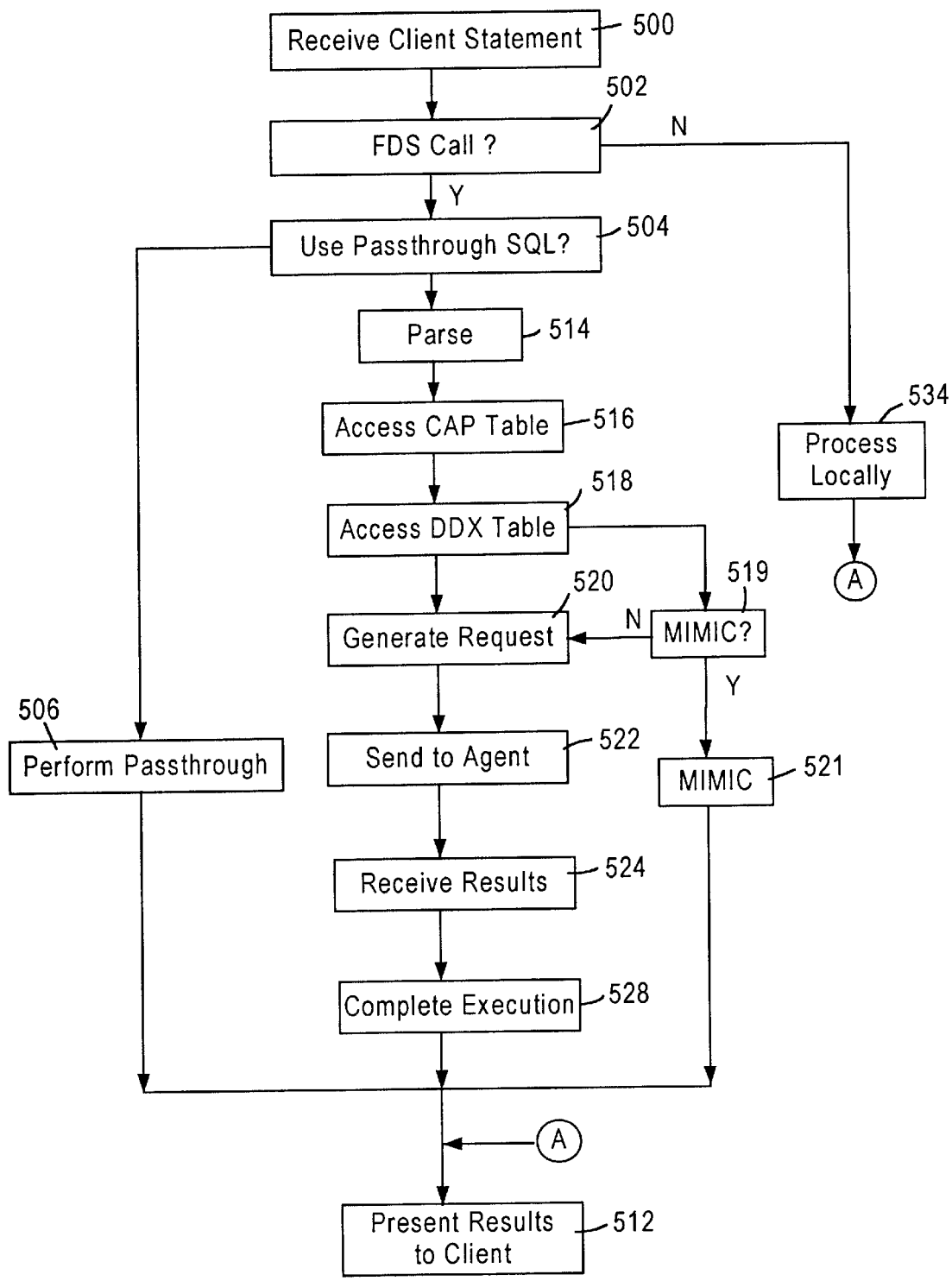
FIG. 6 is a diagram illustrating the method for processing a statement from a client according to an embodiment of the present invention.

FIG. 6 is a flow diagram illustrating a method for processing a statement from the client 200 according to an embodiment of the present invention. The steps of FIG. 6 illustrate the transparent SQL, passthrough SQL and distributed external routines functionality of the architecture of FIG. 3.

As shown in FIG. 6, the local server 202 receives the statement, for example a SQL statement, in step 500 from the client 200. The local server 202 determines in step 502 whether the client statement includes a reference to a foreign database system, for example if the client statement includes a database link. A database link is an identifier that points to the foreign database system as specified in the remote link table. An example of a database link occurs in the SQL statement "select * from table @ DB_A," where the remote link table 275 identifies the database link "@ DB_A" as a reference for the foreign database system 208. The reference to a foreign database system 208 by the database link implicates the use of heterogeneous services 210.

If the local server 202 determines the client statement includes a reference to a foreign database system 208, the local server 202 submits the client statement to the heterogeneous services 311. Heterogeneous services 311 determine whether the statement includes a call to the passthrough SQL module 207 from the user's schema and the data dictionary 220, step 504. If the client statement is a call using the passthrough SQL module 207, the client statement is intercepted and mapped onto the generic API 212 to the agent 300 corresponding to the referenced foreign database system 208 in step 506.

If the client statement includes the foreign database system reference and the local server process 202 determines in step 504 that the client statement is not a call to the passthrough SQL module 207, the local server process 202 parses the client statement in step 514 to determine a plurality of operations necessary for execution of the client statement.

The local server 202 then identifies at least one of the operations to be performed by the foreign server 208 by accessing the capabilities table 224 in step 516 to compare the relative capabilities of the identified foreign system 208 relative to the operation to be performed. For example, the local server 202 will control the SQL services module 210b to access the capabilities table 224 in order to determine whether the foreign server 208 can perform a particular query. Alternatively, the local server 202 will control the transaction services module 210a to access the capabilities table 224 to determine whether the foreign server 208 can perform an operation such as a two-phase commit. If the capability table 224 indicates that the target foreign process 208 is capable of performing the prescribed operation, the heterogeneous services module 311 performs the necessary translations in steps 518 and 520 (e.g., API translation, SQL statement translation, data dictionary translation) and sends the converted operation and the data type translation information to the agent 300 in step 522 for data type translation by the conversion module 211 and the corresponding module 210'.

As an example of the translation, the local server 202 accesses the data dictionary translation table 231 to determine whether a data dictionary table specified in the statement exists for the foreign server 208. For example, a client statement may include the expression "select * from allusers @ FDS", where the data dictionary table "allusers" is defined in the local database 306 but not the foreign database "FDS" 308. The DDX 231 may specify that the database "FDS" 308 has two tables A and B, and that the joining of tables A and B from the foreign database 308 provides the same information as in the "allusers" table defined in the local database 306. Hence, the appropriate module 210 generating the request performs a substitution to convert the SQL statement from "select * from allusers @ FDS" to "select * from (select * join A, B) @ FDS", which is then passed to the FDS database in step 522.

If the DDX 231 does not include a reference to a specified table, then the local server 202 checks to see if the user's schema defines the unknown table. If there is no definition for the unknown table in the user schema, then the local server 202 checks its internal data dictionary generally. The DDX 231 includes table definitions that are perceived to be in the foreign database system 208, even though the foreign system 208 may not have the specified table, or the foreign database system may not store the requested information in a compatible database structure. For example, the foreign database may not support object definitions using data dictionary tables. In this case, the DDX 231 table specifies that the unknown table is a mimicked table.

If the DDX 231 indicate in step 519 the objects specified in the client statement need to be mimicked, then the local server 202 will process the request locally in step 521 as a "describe" finction, as described above. In such a case, the local server 202 would return to a table with zero rows in step 512. Hence, the mimic function enables the local server 202 to return at least the structure of the table specified in the client statement, as opposed to a global error message without any results to the client statement.

Another type of translation is finction translation. For example, suppose that the client 200 issues the statement "select foo(a, b) from table @ FDS," where foreign database system "FDS" does not implement the function "foo," but there are one or more other functions at the foreign database system what will produce the same result. In this example, assume that foreign database system has two functions, "f1" and "f2," which can indirectly implement the functionality of "foo." In this case, function translation results in a statement, such as "select f1($a$)+f2($b$) from table @ FDS."

Execution is completed in step 528 by the local server 202 before sending the results to the client 200. For example, assume the function "foo" is not supported, directly or indirectly, by the foreign system, as specified by the capabilities table 224. In such a case, the statement "select foo(A, B) from table @ FDS" would be parsed by the local server process 202 in step 514, and the SQL services module 210b would generate a request in step 520 as "select A, B from table @ FDS". Upon receiving the contents of tables A and B from the foreign process database system "FDS" 308 in step 524, the local server 202 completes execution in step 528 by performing the operation "foo" on the results of the query "select A, B from table @ FDS". Thus, the process of executing the function in the local server 202 using data accessed from the foreign database system 308, also referred to as "post-processing," appears to the client application 200 to be fully executed within the local database server 202, even though agent process 300 extracts the data from the foreign database system 208.

Another kind of post-processing is "post where-clause filtering" in which the where-clause cannot be executed by the foreign system 208. In the above example, the where-clause of query "select A from table @ FDS where A=foo (B)" cannot be executed by the foreign system 208, because "foo" is not an operation implemented on foreign system 208. In this case, the query "select A, B from table @ FDS" is submitted to the foreign system 208 via agent process 300, and the local server 202 completes the execution of the query by calling the local "foo" operation with the values of A and B received via agent process 300. Thus, postprocessing helps make a heterogeneous distributed database system look like a homogeneous database system (e.g., the client process 200 need not know that "foo" is unavailable for foreign system 208), promoting transparency.

The passthrough SQL feature as described with respect to steps 506, 508, and 510 and the transparent SQL feature described with respect to steps 514 through 528 provide an arrangement where at least a portion of a statement received by the local server 202 is executed at the foreign server 208 in a manner such that the fact that the remote operation is performed on a foreign database is transparent to the user. In the case of passthrough SQL, the database link used as part of the identifier, and the agent process 300 acts as a virtual interface for the foreign server 208, since a plurality of foreign statements can be collected by the passthrough module 207 prior to sending the statements to the foreign server 208. The collection of statements is particularly beneficial for bind calls. In the case of transparent SQL, The agent process 300 gives the appearance to the client 200 that all operation, including access of data from the foreign database 308 and distributed transactions between the local server 202 and the foreign database 308, is performed within a homogeneous system.

As shown in step 502 in FIG. 6, the passthrough SQL and transparent SQL operations are performed based detecting in the client statement a reference to a foreign database system 308. If there is no reference to a foreign database system, the local server 202 executes the statement within the native distributed database system (e.g., at the local server 202 or a remote server process from the same vendor), assuming the operation is not an external routine.

According to the disclosed embodiment, completion of the statement for the client 200 results in the connection 310 between the local server 202 and the agent process 300 to be torn down, although the agent process 300 may be maintained and reinitialized for subsequent requests, if desired.

The present invention provides an architecture providing scaleable, efficient access to data in a heterogeneous database environment, where the non-native characteristics of the distributed database system are transparent to the clients. The agent process 300 provides a framework that allows for translation and transaction services to operate in a heterogeneous environment, where specialized modules provide dynamic translation services for respective database operations. The query services module provides dynamic translation of query statements between the client application and the foreign database systems, while the local server process maintains control of completing the statement. The transaction services module coordinates and manages transactions among the various database systems. In addition, use of database drivers for each foreign database system enables the disclosed architecture to utilize the full capabilities of the respective foreign database systems.

In addition, the disclosed architecture provides reliable execution of processes without risking the local server process operation by providing a plurality of agent processes executing in separate address spaces that communicate with the local server process via a database link. Hence, if a fault occurs in a foreign process, such as a foreign server instance or an agent executing an external routine, the link with the faulty process can be terminated without adversely affecting the local server process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for processing a statement from a client, comprising the steps of:

receiving the statement at a local database system, said statement specifying a plurality of operations that need to be performed to execute the statement;

identifying at least one of the operations specified by the statement to be performed by a foreign database system, wherein said at least one of the operations includes an access to metadata in a structure supported by the local database system and not supported by the foreign database system;

generating a request for the foreign database system to perform said at least one of the operations based on the statement specifying said at least one operation, wherein the request includes an access to metadata in a structure supported by the foreign database system; and sending the request to the foreign database system to perform said at least one of the operations.

2. The method of claim 1, wherein the step of generating a request for the foreign database system includes the steps of:

accessing a data dictionary translation table specifying data dictionary table names and respective translation instructions for data dictionary structures in the foreign database system; and generating the request based on the data dictionary table names and respective translation instructions for the data dictionary structures in the foreign database system.

3. The method of claim 2, wherein the step of accessing a data dictionary translation table includes the steps of:

identifying said foreign database system based on the statement; and identifying metadata stored in the foreign database system needed to process said at least one of the operations.

4. The method of claim 1, wherein the step of generating the request includes the step of converting the statement into a query to retrieve the metadata stored in the foreign database system needed to process said at least one of the operations.

5. The method of claim 4, further comprising the step of performing a group of said operations not performed by the foreign database system based on retrieval of the metadata stored in the foreign database system needed to process said at least one of the operations.

6. The method of claim 4 further comprising the steps of:

receiving a response to the request from the foreign database system, the response including the metadata stored in the foreign database system needed to process said at least one of the operations; and performing a group of said operations not performed by the foreign database system based on the response to the request from the foreign database system.

7. The method of claim 6, further comprising the step of completing execution of said at least one of the operations based on the received metadata stored in the foreign database system needed to process said at least one of the operations.

8. The method of claim 1, wherein the step of sending a request includes the steps of:

generating the request in a first format readable by the database server;

sending the request to an agent process;

converting the request into a second format readable by the foreign database system in the agent process; and sending the converted request having the second format from the agent process to the foreign database system.

9. A method for processing a statement from a client, comprising the steps of:

receiving the statement at a local database system, said statement specifying a plurality of operations that need to be performed to execute the statement;

identifying at least one of the operations specified by the statement to be performed by a foreign database system, wherein said at least one of the operations includes an access to metadata in a structure supported by the local database system and not supported by the foreign database system;

converting the statement specifying said at least one of the operations to be performed by a foreign database system into a request based on stored data describing data dictionary translations for the foreign database system; and sending the request from the local server process to the foreign database system to perform said at least one of the operations for processing of the statement, wherein the request includes an access to metadata in a structure supported by the foreign database system.

10. A computer-readable medium having stored thereon sequences of instructions for responding to a request for performance of an operation received by a local server process, the sequences of instructions including instructions for performing the steps of:

receiving the statement at a local database system, said statement specifying a plurality of operations that need to be performed to execute the statement;

identifying at least one of the operations specified by the statement to be performed by a foreign database system, wherein said at least one of the operations includes an access to metadata in a structure supported by the local database system and not supported by the foreign database system;

generating a request for the foreign database system to perform said at least one of the operations based on the statement specifying said at least one operation, wherein the request includes an access to metadata in a structure supported by the foreign database system; and sending the request to the foreign database system to perform said at least one of the operations.

11. The computer-readable medium of claim 10, wherein the sequences of instructions further comprise sequences of instructions for performing the step of:

completing execution of the statement based on results received from the foreign database.

12. A computer-readable medium having stored thereon sequences of instructions for responding to a request for performance of an operation received by a server, the sequences of instructions including instructions for performing the steps of:

receiving the statement at a local database system, said statement specifying a plurality of operations that need to be performed to execute the statement;

identifying at least one of the operations specified by the statement to be performed by a foreign database system, wherein said at least one of the operations includes an access to metadata in a structure supported by the local database system and not supported by the foreign database system;

converting the statement specifying said at least one of the operations to be performed by a foreign database system into a request based on stored data describing data dictionary translations for the foreign database system; and sending the request from the local server process to the foreign database system to perform said at least one of the operations for processing of the statement, wherein the request includes an access to metadata in a structure supported by the foreign database system.

13. A computer system configured to respond to a statement, comprising:

a computer-readable medium storing a data dictionary that includes a data dictionary translation table specifying mapping information on how to map from a local data dictionary table to a foreign data dictionary table of a foreign database system; and a local server process configured for receiving the statement from the client and determining operations necessary for execution of the statement, wherein the local server process includes a heterogeneous services module configured for:

identifying at least one of said operations specified by the statement to be performed by a foreign database system, wherein said at least one of the operations includes an access to metadata in a structure supported by the local server process and not supported by the foreign database system;

converting the statement specifying said at least one of the operations to be performed by a foreign database system into an operation request based on stored data describing data dictionary translations for the foreign database system; and sending the operation request to the foreign database system to said at least one of the operations, wherein the operation request includes an access to metadata in a structure supported by the foreign database system.

14. The system of claim 13, wherein the heterogeneous services modules is further configured to control function translation of a function referenced in a query from a first format readable by the local server process to the format readable by the foreign database system.

15. The system of claim 14, wherein the heterogeneous services module is further configured for mapping the operation request from a native Application Programming Interface (API) protocol and a generic API.

16. The system of claim 15, wherein the heterogeneous services module is further configured for post-processing the results received from the foreign database system into a format suitable for the local server process completing execution of the statement.

17. The system of claim 13, wherein the data dictionary further includes a capabilities table specifying operations executable by the foreign database system, the local server process sending the operation request based on accessing the capabilities table.

18. The system of claim 17, wherein the local server process is further configured for translating a use of the local data dictionary table specified in the operation request to a corresponding use of the foreign data dictionary table in response to accessing the data dictionary translation table.

19. The system of claim 13, further comprising an agent process in communication with the foreign database system and configured for receiving the operation request from the local server process, converting the operation request to a format corresponding to the foreign database system, and outputting the converted operation request to the foreign database system, the agent process forwarding the results from the foreign database system to the local server process;

wherein the data dictionary further includes a capabilities table specifying operations and transaction capabilities executable by the foreign database system; and the heterogeneous services modules further includes a transaction module configured to coordinate transactions between the local server process and the foreign database system, the transaction module generating a transaction message to the agent process based on corresponding transaction capabilities.

20. The system of claim 19, wherein the agent process includes a second transaction module for mapping the transaction message from a first format readable by the local server process onto an Application Programming Interface (API) for translation by a foreign database driver, the foreign database driver translating the transaction message from the API to a second format readable by the foreign database system for executing the transaction message.

21. The system of claim 20, wherein the second transaction module maps a transaction response, generated by the foreign database system in response to executing the transaction message, from the API to the first format, the foreign database driver having converted the transaction response from the second format to the API.

22. The system of claim 21, wherein the transactions coordinated between the local server process and the foreign database system include a distributed transaction between the local server process and the foreign database system.

23. The system of claim 22, wherein the distributed transaction is a two-phase commit-distributed transaction.

* * * * *